United States Patent [19]
Franklin

[11] Patent Number: 4,677,616
[45] Date of Patent: Jun. 30, 1987

[54] FLOW CONTROL SCHEME FOR A SWITCHING NETWORK

[75] Inventor: Andrew D. Franklin, Boulder, Colo.

[73] Assignees: AT&T Company; AT&T Information Systems Inc., both of Holmdel, N.J.

[21] Appl. No.: 774,750

[22] Filed: Sep. 11, 1985

[51] Int. Cl.[4] ............................................. H04J 3/26
[52] U.S. Cl. ........................................ 370/94; 370/85
[58] Field of Search ..................... 370/60, 85, 94, 89, 370/58; 340/825.5, 825.01

[56] References Cited

U.S. PATENT DOCUMENTS

| | | | |
|---|---|---|---|
| 4,074,232 | 2/1978 | Otomo et al. | 340/147 R |
| 4,079,209 | 3/1978 | Schwerdtel | 179/18 EA |
| 4,380,063 | 4/1983 | Janson et al. | 370/60 |
| 4,475,192 | 10/1984 | Fernow et al. | 370/94 |
| 4,500,990 | 2/1985 | Akashi | 370/85 |

OTHER PUBLICATIONS

"Simulation and Performance Analysis of An X.25 Network", 1979 Conference Record, vol. 1 of three volumes, G. Bockle, 1979, pp. 3.3.1–3.3.7.
"Bottleneck Flow Control", IBM Technical Disclosure Bulletin, K. Bharath-Kumar, J. M. Jaffe and F. H. Moss, 1981, pp. 2044–2046.
"Methods, Tools, and Observations on Flow Control in Packet-Switched Data Networks", IEEE, 1981, L. Pouzin, pp. 413–426.
"Analysis of Flow-Controls in Switched Data Network by a Unified Model", G. Pujolle, pp. 123–128.

Primary Examiner—Douglas W. Olms
Attorney, Agent, or Firm—Donald M. Duft

[57] ABSTRACT

A flow control mechanism for a packet switching system that provides for the continuous dynamic control of station window size beginning with call setup and extending through the duration of the call. A station window size can be of a first magnitude at call setup time when system traffic may be low. The window size can be subsequently reduced to free up port buffer space as system traffic increases. This permits the serving of more calls during periods of heavy traffic.

19 Claims, 21 Drawing Figures

FIG. 1 PACKET SWITCHING SYSTEM 100

FIG. 2 PACKET SWITCHING SYSTEMS 100 AND 200

FIG. 3
BUFFER 103
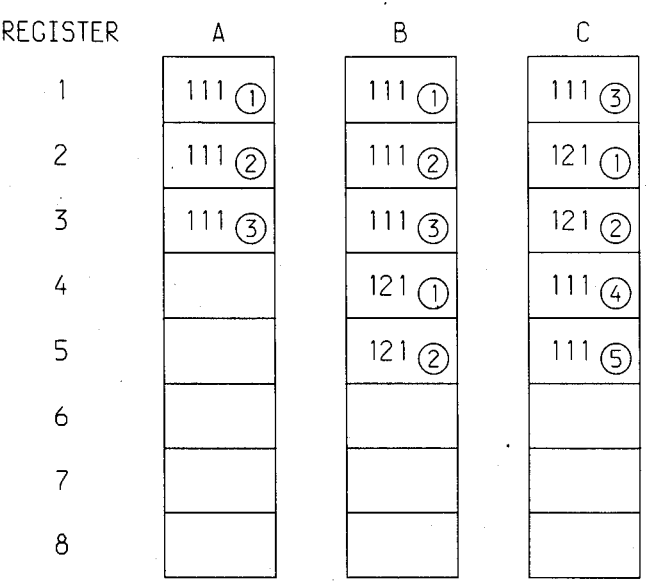
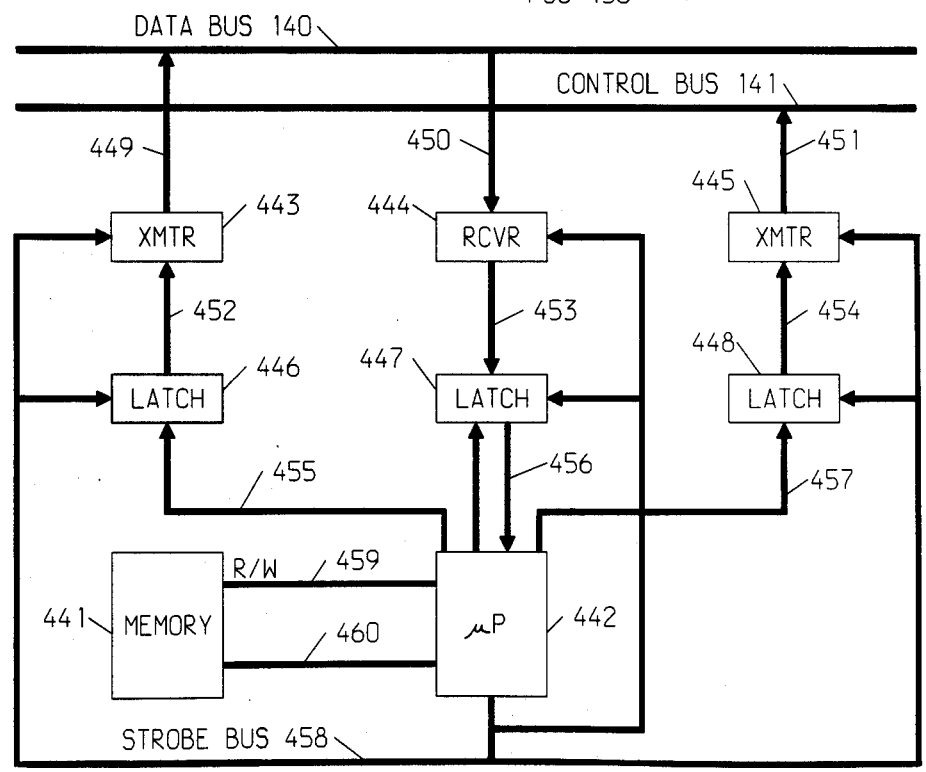
FIG. 4
PSC 130

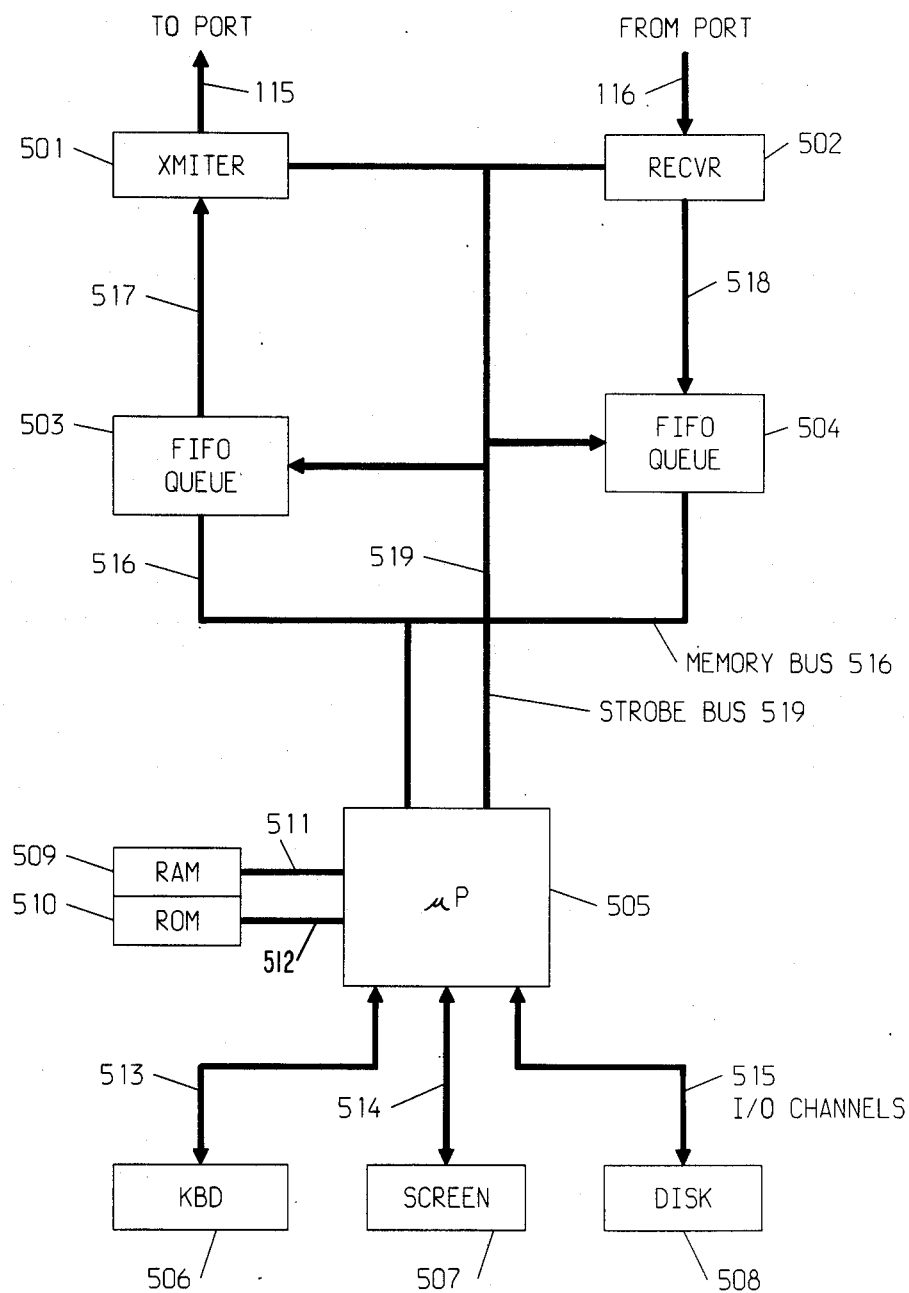

FIG. 6

MESSAGE 1- CALL

| PSC ADDRESS |
| --- |
| SIGNALING CHANNEL NUMBER |
| CALL |
| CALL ID |
| DIALED STATION'S NUMBER |
| CALLING STATION LOGICAL CHANNEL NUMBER |
| CALLING STATION RECEIVER BUFFER SIZE |

SENT FROM CALLING STATION TO PSC AT CALL ORIGINATION

FIG. 7

MESSAGE 2- INCALL

| CALLED PORT ADDRESS |
| --- |
| STATION SIGNALING CHANNEL NUMBER |
| INCALL |
| CALL ID |
| CALLING STATION RECEIVER BUFFER SIZE |

SENT FROM PSC TO CALLED STATION TO ALERT CALLED
STATION OF INCOMING CALL AND CALLING STATION BUFFER SIZE

FIG. 8

MESSAGE 3-ANSWER

| PSC ADDRESS |
| --- |
| SIGNALING CHANNEL NUMBER |
| ANSWER |
| CALL ID |
| CALLED STATION LOGICAL CHANNEL NUMBER |
| CALLED STATION RECEIVER BUFFER SIZE |

SENT FROM CALLED STATION TO PSC WHEN CALL IS ANSWERED
AT CALLED STATION

FIG. 9

MESSAGE 4-ANSWERED

| CALLING PORT ADDRESS |
| --- |
| SIGNALING CHANNEL NUMBER |
| ANSWERED |
| CALL ID |
| CALLED STATION RECEIVER BUFFER SIZE |

SENT FROM PSC TO CALLING STATION TO ADVISE THAT CALL HAS BEEN ANSWERED AND CALLED STATION RECEIVER BUFFER SIZE

FIG. 10

MESSAGE 5- REDUCE TRANSMIT WINDOW

| PORT ADDRESS |
| --- |
| SIGNALING CHANNEL NUMBER |
| REDUCE TRANSMIT WINDOW |
| CALL ID |
| REDUCED RECEIVER BUFFER SIZE |

SENT FROM PSC TO ANY STATION TO REDUCE ITS TRANSMIT WINDOW WHEN REALLOCATION BUFFER SIZE FOR A NEW CALL

FIG. 11

MESSAGE 6- REDUCE ACKNOWLEDGE

| PSC ADDRESS |
| --- |
| SIGNALING CHANNEL NUMBER |
| REDUCE ACKNOWLEDGE |
| CALL ID |

SENT FROM ACKNOWLEDGING STATION TO PSC TO ACKNOWLEDGE RECEIPT OF MESSAGE 5 BY ACKNOWLEDGING STATION

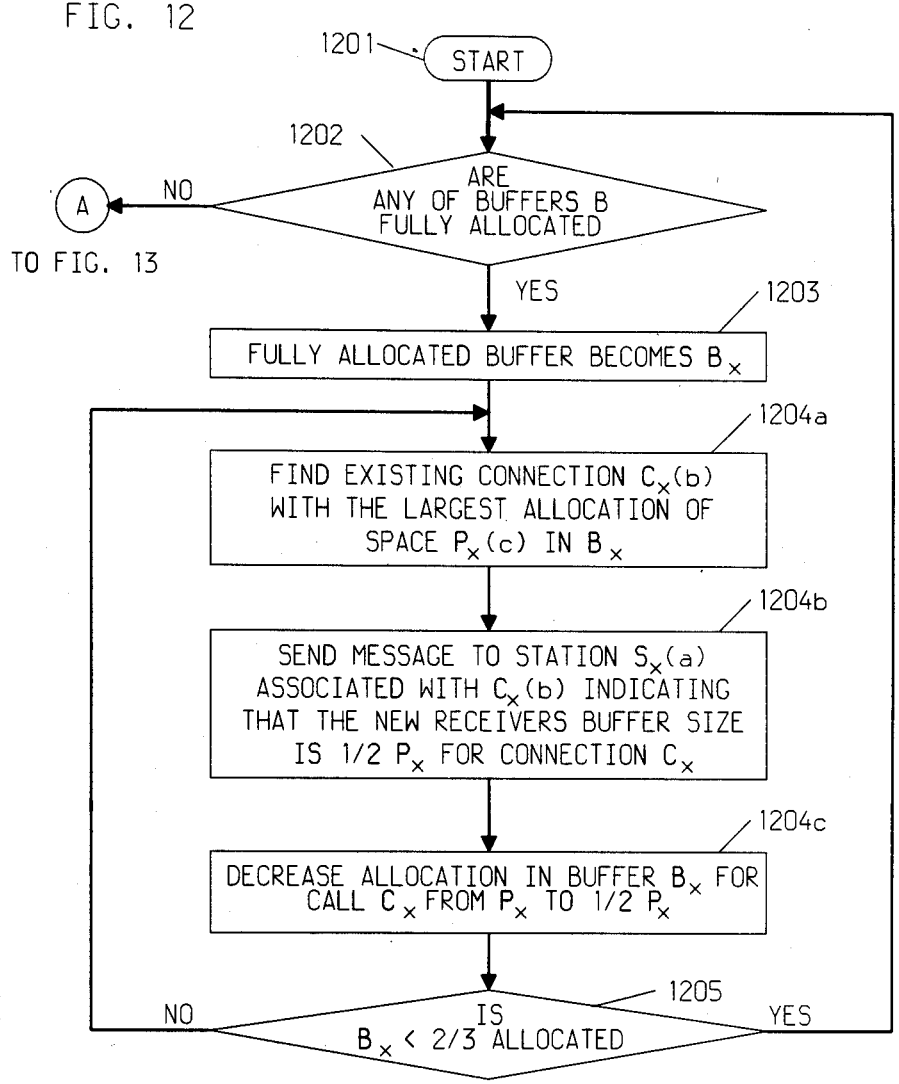

FIG. 12

CONDITIONS UPON ENTRY TO START ELEMENT 1201:
   1-RECEIVING STATION S1 HAS INDICATED RECEIVER BUFFER
   SIZE OF P PACKETS TO PSC 110.
   2-BUFFERS B ALONG ROUTE TO SENDING STATION KNOWN TO PSC 110.

NOTES TO PROCESSES 1204a, 1204b, AND 1204c
   a–$S_x$ = STATION POTENTIALLY TRANSMITTING INTO BUFFER $B_x$
   b–$C_x$ = THE CALL USING BUFFER ALLOCATION TO BE REDUCED BY
        PROCESS 1204
   c–$P_x$ = ALLOCATED SPACE FOR CALL $C_x$ IN BUFFER $B_x$

CONDITIONS UPON EXIT FROM ELEMENT 1316:
P IS ALLOCATED BUFFER SIZE ALONG ROUTE FROM SENDING STATION S2 TO RECEIVING STATION S1.

FIG. 14

| CALL |
|---|
| PORT 222 ADDRESS |
| TRUNK SIGNAL CHANNEL NUMBER |
| CALL |
| CALL ID |
| DEST. STATION ADDRESS |
| TRUNK LOGICAL CHANNEL NUMBER |
| CALLING SYSTEM RECEIVER BUFFER SIZE |

FIG. 15

| CALL |
|---|
| PSC 130 ADDRESS |
| TRUNK SIGNALING CHANNEL NUMBER |
| CALL |
| CALL ID |
| DEST. STATION ADDRESS |
| TRUNK LOGICAL CHANNEL NUMBER |
| CALLING STATION RECEIVER BUFFER SIZE |

FIG. 16

| ANSWER |
|---|
| PORT 152 ADDRESS |
| TRUNK SIGNALING CHANNEL NUMBER |
| ANSWER |
| CALL ID |
| TRUNK LOGICAL CHANNEL NUMBER |
| CALLED STATION RECEIVER BUFFER SIZE |

FIG. 17

ANSWER

| PSC 230 ADDRESS |
|---|
| SIGNALING CHANNEL NUMBER |
| ANSWER |
| CALL ID |
| TRUNK LOGICAL CHANNEL NUMBER |
| CALLED STATION RECEIVER BUFFER SIZE |

FIG. 18

REDUCE TRANSMIT WINDOW

| PORT 222 ADDRESS |
|---|
| TRUNK SIGNALING CHANNEL NUMBER |
| REDUCE TRANSMIT WINDOW |
| CALL ID |
| REDUCED RECEIVER BUFFER SIZE |

FIG. 19

REDUCE TRANSMIT WINDOW

| PSC 130 ADDRESS |
|---|
| TRUNK SIGNALING CHANNEL NUMBER |
| REDUCE TRANSMIT WINDOW |
| CALL ID |
| REDUCE RECEIVER BUFFER SIZE |

FIG. 20

REDUCE ACKNOWLEDGE

| PORT 152 ADDRESS |
| TRUNK SIGNALING CHANNEL NUMBER |
| REDUCE ACKNOWLEDGE |
| CALL ID |

FIG. 21

REDUCE ACKNOWLEDGE

| PSC 230 ADDRESS |
| TRUNK SIGNALING CHANNEL NUMBER |
| REDUCE ACKNOWLEDGE |
| CALL ID |

FLOW CONTROL SCHEME FOR A SWITCHING NETWORK

TECHNICAL FIELD

This invention relates to a packet switching system and, in particular, to improved congestion management facilities for a packet switching system.

BACKGROUND OF THE INVENTION

In local area networks of the centralized bus type, e.g. datakit, the buffers used for queuing data on the port boards of such systems are subject to congestion or overflow during periods of high traffic on the network.

A problem exists with respect to the provision of port buffers that are cost effective and also minimize the possibility of buffer overflow. Obviously, the overflow problem would not exist if buffers of unlimited size could be used. This however, is not economically feasible because of the cost of large buffers. Instead, it is necessary to use buffers of moderate size and to adopt system operating procedures that provide for the efficient use of the provided buffers.

A first such procedure that could be used ignores the actual buffer size and assumes that the buffer is of unlimited capacity. All virtual circuit calls are accepted by the system even though buffer overflow takes place. This procedure relies on the error correction capabilities of the end-to-end protocol used by the sending and receiving stations to correct any data that is lost or mutilated due to buffer overflow. A typical error recovery technique requires the sending station to retransmit any packets that are lost or mutilated. This procedure has the undesirable consequence of further increasing traffic in a system that is already congested. This can cause a further loss of data and even still more retransmission and, in turn, more congestion.

Another procedure that could be used logically allocates a fixed amount of buffer space to each virtual call regardless of the actual buffer space required by the call. The system then accepts no further calls that require the use of a fully allocated buffer. This procedure assumes that each call uses all of its allocated buffer space. Thus, new calls are sometimes not served in accordance with this procedure even though free buffer space actually exists. This technique is disadvantageous since each call does not require the same amount of buffer space and some calls do not use all of their buffer allocation.

Other flow control mechanisms are known that avoid buffer overflow, but such mechanisms require that the data transmission protocol be terminated in the packet switch port or at each network node. Such an arrangement is disclosed in U.S. Pat. No. 4,475,192, issued Oct. 2, 1984 to J. P. Fernow and R. P. Levy. Fernow discloses a multi node system in which each node terminates the protocol and independently provides for flow control between it and adjacent nodes. This arrangement is satisfactory for large wide area networks which can afford the costs and complexity of such an arrangement. However, the Fernow et al system is not suitable for small local area networks where speed and economy are paramount. In particular, such systems are not suitable for use in a centralized bus packet switching systems of the type comprising the subject matter of the present invention.

Thus, a problem still exists in local area networks regarding the provision of an efficient congestion control mechanism for preventing buffer overflow.

SUMMARY OF THE INVENTION

My invention solves the problem of buffer overflow by relying on a flow control mechanism in which the protocol is end to end with respect to the transmitting and receiving terminals. The exemplary disclosed embodiment of my invention includes a system controller that monitors the occupancy of the buffers of each port dynamically. The controller manages buffer congestion by controlling the maximum amount of outstanding unacknowledged data that an endpoint, such as a terminal, is allowed. This amount is referred to as the endpoint's window size. By controlling the window size used by each terminal or endpoint whose transmitted data must be buffered in the packet switch port, the level of congestion experienced by such a port can be controlled.

Each endpoint's window size is set by the system controller at call setup time. The system controller tells a transmitting terminal how many packets (the window size) it can send to a receiving terminal before the transmitting terminal must wait for a returned acknowledgment from the receiving terminal indicating the previously transmitted data has been received correctly by the receiving terminal. This window size specifies the maximum amount of space that can be used by the transmitting terminal within each port buffer in the path between the transmitting and receiving terminals. The allocation can be relatively large at call setup time if the total network traffic is low.

Subsequently, as the system traffic increases and more calls are directed through the port buffer, the buffer may become fully allocated and unable to serve additional calls. The system controller at that time sends a message to one or more of the transmitting terminals that are using the buffer telling them to reduce their window size. This makes port buffer space available to serve new calls.

This dynamic control is advantageous in that the port buffer allocation can be relatively liberal during periods of low traffic and may become more conservative as traffic increases and the buffer space is used up. For example, assume a port buffer size of 20 packets and also assume that a window of 5 packets is allocated to each endpoint on a first and second and a third call that utilize that port buffer. This allocates 15 of the 20 available packet areas within the buffer. The system controller may then become conservative in its allocation as future calls are served. Thus, the fourth call can be allocated a window size of 3, and the 5th call a window size of 2. This would fully allocate the buffer and leave it unavailable to serve additional calls. In accordance with my invention a 6th and 7th call may be served by having the system controller send a message to the transmitting terminals on the first two calls reducing the window size from 5 to 3. This makes additional port buffer space available so that windows of 2 each can be allocated to calls 6 and 7.

Thus, as can be seen from the above example, my end to end window size allocation arrangement provides for the efficient usage of port buffers in packet switching systems.

BRIEF DESCRIPTION OF THE DRAWING

My invention's advantages may be better understood from a reading of the description of one possible exemplary embodiment thereof taken in conjunction with the drawings in which:

FIG. 3 illustrates one possible way in which port buffer 103 of FIG. 1 may be filled during the serving of calls;

FIG. 4 illustrates further details of system controller 130;

FIG. 5 illustrates further details of a station terminal;

FIGS. 6 through 11 illustrate the details of various system messages; and

FIGS. 12 and 13 are a flow chart illustrating the system operation during the serving of calls.

FIGS. 14 through 21 illustrate the details of additional system messages.

DETAILED DESCRIPTION

Figure 1:
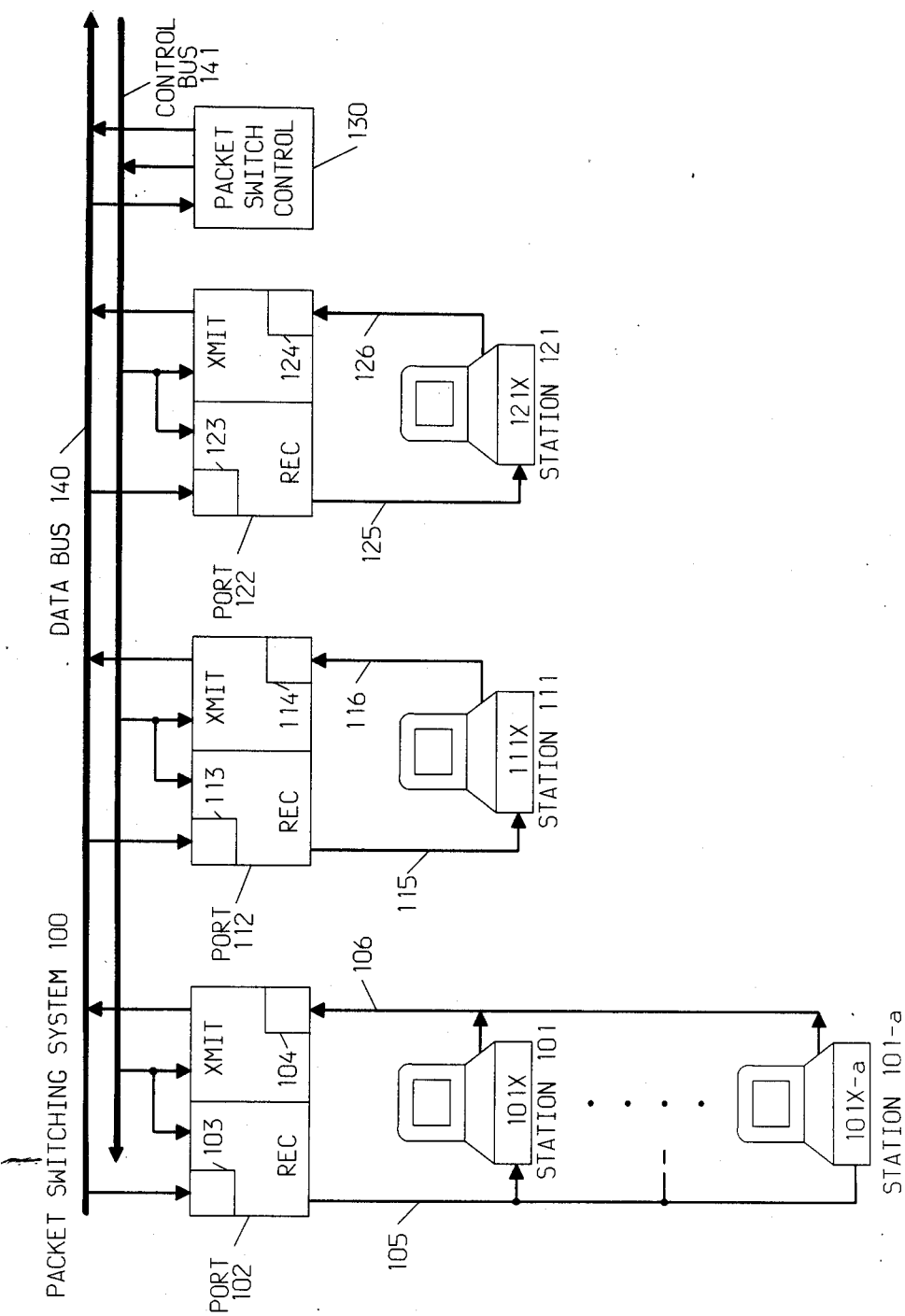
FIG. 1 illustrates a first illustrative packet switching system embodying the invention.

FIG. 1 shows a packet switching system 100 comprising stations 101, 101-a, 111 and 121, ports 102, 112 and 122, and packet switch control (PSC) 130. The system also comprises data bus 140 and control bus 141. Each port has both incoming and outgoing buffers. The incoming port buffers are 103, 113 and 123. The outgoing port buffers are 104, 114 and 124. Each station has an incoming buffer. The station buffers are 101X, 101X-a, 111X and 121X. Port 102 serves stations 101 and 101-a. Ports 112 and 122 serve stations 111 and 121, respectively. Stations 101, 101-a, 111 and 121 may be terminals, minicomputers or any other device that is capable of transmitting and receiving data.

The packet switching system 100 interconnects a station, such as 111, via data bus 140 with a station, such as 101. This interconnection takes place under the control of PSC 130. PSC 130 is microprocessor controlled and has a software cross-index that associates the number dialed for each station being called with equipment addresses used by the system for switching. PSC 130 also has a software table that specifies the packet capacity of port buffers 103, 113, 123, 104, 114, and 124. Both the cross-index and the table may be manually programmed by the system administrator into the memory of packet switch controller 130.

Signaling Channel

There are several steps to establishing a virtual circuit call between stations in the system of FIG. 1. It is useful to describe what is termed the "signaling channel" used by stations, such as 101, before describing these steps in detail. Each station has several logical channels available to it and extending between it and its serving port. One such logical channel of each station, is termed the signaling channel and is reserved for communication via its port with the PSC 130. During initialization of the system, PSC 130 programs each port, such as port 102, over control bus 141 with translation information. This translation information permits subsequent packets received on the signaling channel incoming to the port from the station served by the port to be sent to PSC 130 over data bus 140 and one of the logical channels serving PSC 130. Each such logical channel of PSC 130 is represented by a number in the packets address field that uniquely identifies the sending station and the port serving the sending station. This logical channel number of PSC 130 will be referred to hereinafter, as the signaling channel identifier (ID).

When there is need for a station, such as 101, to communicate with PSC 130, for example, as when setting up a call to another station (the called station), the calling station sends to its associated port 102 a signaling packet having an address field containing the calling station's signaling logical channel number. The packet further includes signaling data which includes the logical channel number to be used by the calling station for the call and the dialed number of the called station.

In general, calling ports such as 102 translate the address field of each packet received from its served station, such as 101, by replacing the logical channel number contained in the address field of the packet with the destination port address and a destination logical channel number associated with the destination port as obtained from the calling port's priorly programmed translation memory. The modified packet is placed on data bus 140 by port 102 and is received by the port specified by the destination port address. For a signaling channel message, PSC 130 is the destination port. Therefore, because of the translation provided to ports, such as 102, at system initialization, as described above, the address field of each packet received by each such port from its served station on a signaling channel, i.e. each signaling packet, is translated to contain the port address of PSC 130 and the signaling channel ID that identifies the calling station and its serving port. The signaling packet is then routed to PSC 130.

Hereinafter, signaling channel will be considered to exist between each station, such as 101 and PSC 130. PSC 130 can also send signaling packets to each station, such as 101, over the station's signaling channel by placing the signaling packet whose address field contains the station's serving port address and the stations signaling channel number onto data bus 140.

PSC 130 receives and takes action on the packet sent to it containing the signaling data. The PSC uses its cross-index for the dialed number and, from this cross index, finds the address of the port which serves the called station and an idle logical channel associated with the called station. This address and logical channel information is sent to the calling port and is programmed into a translation RAM in calling port 102 with the calling station 101 logical channel number specified in the signaling packet being used as the RAM's address. Subsequently, each time the caling station 101 sends a packet to its port 102 which contains the logical channel used by station 101 for communicating with the called station, the calling station's logical channel number is received and used as address information for the calling port's RAM to readout the called port address and called station logical channel number priorly received from PSC 130. This readout information is inserted by the calling port as header address information into the packet to be sent to the called port and station. This packet is then applied to data bus 140.

The receiving port serving the called station receives such packets by recognizing its port address in the packet transmitted on data bus 140. It strips off the port address and passes the remaining data of the packet to the receiving station over the specified channel. The mechanism of addressing and translation just described ensures that data is exchanged only between the stations involved on the call.

In summary, several logical channels may be made available to each station when the system is set up. Each such channel extends between the station and its port and each channel is assigned a different number, hereinafter referred to as a station channel number. Each station therefore has a unique station channel number available for each one of several simultaneous virtual circuit calls. One such channel for each station is reserved for use by such station in communicating with PSC 130 and is called the station's signaling channel. The number of this signaling channel and the address of the station's associated port are applied to data bus 140 by PSC 130 when PSC 130 needs to send a signaling packet to the station. The addressed station receives and takes action on the packet sent to it. Such a connection between PSC 130 and a station is called the signaling channel.

Space for signaling messages is permanently reserved by PSC 130 in all port buffers. This reserved buffer space is taken for granted in this description and is hereinafter not discussed since the signaling-message buffer space is extant at all times and under all system conditions.

Dynamic Buffer Control

The equipment comprising a station often has functions other than that of receiving data. A minicomputer may be a station and may be currently processing data in addition to its data receiving and transmission duties on a call. Buffer space is assigned to each call so that incoming data can wait to be read out by a receiving station. A buffer may concurrently serve several calls. Each buffer has a limited capacity to store data and it is necessary that the data conveyed between stations does not exceed the capacity of any port buffer on the route between the two stations.

One method for ensuring that data transmitted by a terminal does not exceed the capacity of any port buffer on the route to the receiving terminal is to specify the window size to be used by each sending station as a parameter of each virtual circuit call. Then for the duration of said call, port buffer space sufficient to hold a window full of data is allocated within each port buffer between sending and receiving stations. Any transmitting station or port may send data until the amount of data sent that remains unacknowledged by the receiving station equals the specified window size. The transmitting station then awaits an acknowledgment from the receiving station before sending further data. The acknowledgment indicates that the first packet sent has been accurately received and removed from the receiving port buffer by the receiving station.

The method just described requires each sending station to know the window size pertaining to it for a particular virtual circuit call in question. Such parameter is specified by PSC 130 during call establishment and subsequently as required to manage the congestion of buffers within the ports of the switch.

First Allocation

Assume station 111 of FIG. 1 calls station 101 for the purpose of sending data to station 101. Station 111 therefore becomes a receiving station for the transmission of data from station 101 to station 111 once the said call is established. Station 111 initiates the call by sending the subsequently described CALL message to PSC 130 over the previously described signaling channel. This CALL message includes a call identifier, the call ID. The call identifier is local to the signaling channel between the calling station 111 and PSC 130 and is randomly selected by station 111. The call identifier is used to associate subsequent signaling messages between the calling station and PSC 130 with this call. This message also specifies the logical channel number (chosen by station 111), that will subsequently be used between station 111 and its serving port 112 for the call. Additionally, the signaling message specifies the space which station 111 has allocated in station buffer 111X for the call, say six packets. Finally, the signaling message contains the dialed number of called station 101. This is signaling message 1 which is shown in FIG. 6, the CALL message.

PSC 130 receives the CALL message and proceeds to find the capacity of the port buffers involved in the transmission of data from station 101 to station 111. By subtracting the space already allocated to existing calls in each of these port buffers, PSC 130 calculates the space available in these buffers for the new call. Assume there is currently space in buffer 113 to store six packets and space in buffer 104 to store eight packets. These are the port buffers involved on a transmission of data from station 101 to station 111. PSC 130 now follows the subsequently described space allocation process of FIGS. 12 and 13 to determine the port buffer space to be allocated for the transmission of data from station 101 to station 111.

Figure 13:
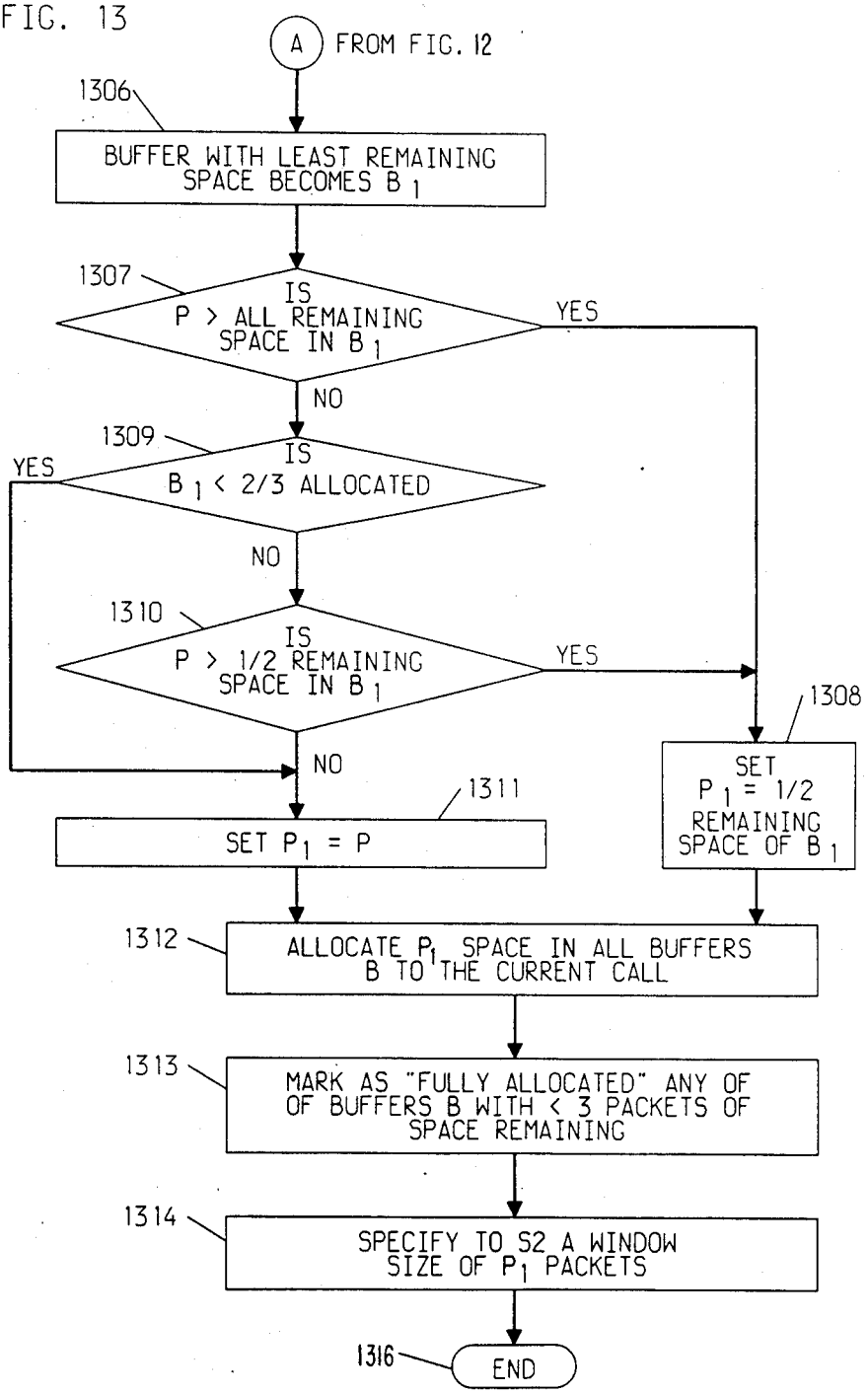

Since FIGS. 12 and 13 apply to all port buffers of FIG. 1, arbitrary reference designators are used. In FIG. 12, it is assumed that a potential data receiving station, "S1", such as station 111, has priorly sent to PSC 130 the number of packets "P", such as six, as the capacity of its incoming buffer 111X. FIGS. 12 and 13 illustrate the process by means of which a space of "P1" packets is allocated in buffers "B". Buffers "B" are all the port buffers that store data sent to station S1, such as 111, from the other station involved on the call (S2), such as 101. Available space P1 is calculated with reference to the one of port buffers B with the least available space. The port buffer with the least available space is termed buffer B1. PSC 130 performs the calculation and sends a packet message over data bus 140 to a station "S2", such as 101, alerting station 101 to the incoming call and specifying that no more than P1 packets may be sent to station S1 (111). This is message 2 of FIG. 7, the INCALL message.

For example, where station S1 is station 111, port buffers B include port buffers 104 and 113 (assumed to have available packet space of eight and six respectively) of FIG. 1. Assume the space in these buffers is currently less than two-thirds allocated. The flowchart of FIG. 12 is entered at element 1201. The first decision made by PSC 130 is in element 1202. None of the port buffers B involved in transmitting data from station 101 to 111 (buffers 104 and 113) is fully allocated so PSC 130 proceeds to element 1306 on FIG. 13. In element 1306, port buffer 113, the buffer with the least remaining space (six packets), becomes buffer B1 since buffer 104 has room for eight packets. In element 1307, PSC 130 compares P, the six packets of space allocated in buffer 111X by station 111, to the six packets of space remaining in port buffer B1 (113). Since P does not exceed the remaining capacity of buffer B1 (113), PSC 130 proceeds to element 1309. Buffer B1 (113) is assumed to be less than two-thirds allocated, so PSC 130 continues to element 1311. In element 1311, PSC 130 sets the space to be allocated, P1, to the value of P (six packets) which is the unallocated space in buffer 113.

In element 1312, PSC 130 now allocates space for six packets in each of port buffers B (buffers 104 and 113) for the call under discussion. PSC 130 now proceeds to element 1313 and marks both buffers 104 and 113 "fully allocated" because neither has as much as three packets of space remaining. Buffer 113 has zero additional space; buffer 104 has space for two additional packets.

PSC 130 continues to element 1314 which is next described. PSC 130 sends call information as message 2 of FIG. 7, the INCALL message, to port 102 over the data bus 140 and the signaling channel of station 101 to called station 101. This signaling message includes the space allocated in port buffers 104 and 113 (six packets) for use when station 101 transmits data to station 111. The INCALL message specifies to station S2 (station 101), that it shall send no more than six packets before receiving an acknowledgement from station 111, i.e. station 101's window size for this call is six packets.

The window size information is used by station 101 as a limit to the number of packets that it can send to station 111 via buffers 104 and 113 before an acknowledgment is received by station 101 from station 111.

Second Allocation

In response to the information received in the IN-CALL message, station 101 sends a signaling packet message via its signaling channel and port 102 to PSC 130 indicating that the available space in buffer 101X for this call is eight packets. This is message 3 of FIG. 8 to ANSWER message. The call ID included in the IN-CALL message is chosen by PSC 130 and is used in subsequent messages sent to and from station 101 to allow those messages to be associated with the call currently under discussion. The process just described, in connection with the allocation of space in port buffers 104 and 113, is now followed for port buffers 114 and 103 which are used in transmitting data from station 111 to station 101. In this case, "station S2" stands for station 111 and station 101 becomes the receiving station "S1".

At this point in the example, assume that there is space in buffer 103 to store eight packets and that there is space in buffer 114 for six packets. PSC 130 again follows the space allocation process of FIGS. 12 and 13.

This time, buffers B include port buffers 114 and 103 of FIG. 1. The flowchart of FIG. 12 is entered at connector 1201 and the first decision made by PSC 130 is in element 1202. None of the port buffers B (114 and 103) is fully allocated so PSC 130 proceeds to element 1306 of FIG. 13. Port buffer 114, the port buffer with the least remaining space (six packets), becomes buffer B1. In element 1307, PSC 130 compares P, the eight packets of space available in buffer 101X to the six packets of space remaining in port buffer B1 (114). Since P exceeds the remaining capacity of buffer B1, PSC 130 proceeds to element 1308. Here, P1 is set to three packets, which is half the space remaining in port buffer B1 (114). PSC 130 then continues to element 1312 in which it allocates space for three packets in each of port buffers B, (114 and 103). PSC 130 proceeds to element 1313. Both buffers 114 and 103 currently have at least three packets of unallocated space remaining, so they are not marked "fully allocated".

In element 1314, PSC 130 sends signaling message 4, of FIG. 9, the ANSWERED message, via port 112 and station 111's signaling channel to calling station 111. This message includes the call ID associating this message with the call under discussion and the space allocated in buffers 114 and 103 (three packets each) for use when station 111 sends data to station 101. The ANSWERED message specifies to station S2 (station 111) that it shall send no more than three packets to station 101 before an acknowledgement is received by station 111 from station 101. This space-available information is used by station 111 as the limit of the number of packets that it can send to called station 101 via buffers 114 and 103 before an acknowledgment is received by calling station 111 from called station 101, i.e. station 111's window size is three packets.

Communication is now possible in each direction between stations 101 and 111. Calling station 111 can send no more than three packets to station 101 before it receives a return acknowledgment from station 101. Called station 101 can send no more than six packets to station 111 before it receives a return acknowledgment from station 111.

Third Allocation

Assume now that the number of station 101 is dialed at station 121 to setup a call from station 121 to station 101. Station 121 sends a CALL message containing one of its virtual channel numbers to be used on the call, the space currently available in its station buffer 121X, and the dialed number of called station 101 via station 121's signaling channel and data bus 140 to PSC 130. This is message 1 of FIG. 6. PSC 130 finds the capacity of all port buffers used in transmitting data between station 101 and station 121 and, by subtracting space already allocated to current calls, calculates the space currently avaiable for the new call. Assume that station 121 allocates space in buffer 121X for three packets and that there is available space in buffers 124 and 123 to store four packets each. There now remains space in buffer 104 for two packets (8-6) and space in buffer 103 for five packets (8-3).

PSC 130 now follows the buffer space allocation process of FIGS. 12 and 13 to compute the port buffer size available for use in transmitting data from station 101 to station 121. Port buffers B now include buffers 104 and 123 of FIG. 1. Assume the space in these buffers is more than two-thirds allocated. The flowchart of FIG. 12 is entered at connector 1201 and the first decision made by PSC 130 is at element 1202. Buffer 104 is said to be fully allocated since it has space for only two packets. PSC 130 proceeds to step 1203. Here port buffer 104 becomes "Bx"-the buffer to be reallocated. In steps 1204a, 1204b and 1204c, PSC 130 redistributes the space in buffer 104 as follows.

Assume the existing connection with the largest allocation of space in buffer 104 is the connection just described in station 111 for the transmission of data from station 101. This space is six packets. PSC 130 now sends a packet message, REDUCE TRANSMIT WINDOW, to station Sx (i.e., 101) specifying that the buffer capacity on the transmission of data from station 101 to station 111 must be reduced from six to three packets. This is message 5 of FIG. 10. PSC 130 waits for the REDUCE ACKNOWLEDGE, message 6 of FIG. 11, to be received from station 101 indicating that PSC 130 may now reallocate the buffer space in buffer 104 previously allocated for transmissions to station 111 from station 101. The action taken by PSC 130 leaves an allocated space in buffer 104 of five packets. Assume this process leaves buffer Bx (104) less than two-thirds allocated. PSC 130 returns via element 1205 to element 1202. Since none of buffers B (104 and 123) is now fully allocated, PSC 130 continues to element 1306 on FIG. 13.

Buffer 123, the buffer with the least remaining space, becomes buffer B1. In element 1307 of FIG. 13, PSC 130 compares the three packets of space available in buffer 121X to the four packets of space remaining in buffer B1 (123). Since P does not exceed the remaining capacity of buffer B1, PSC 130 proceeds to element 1309. Buffer B1 (123) is not less than two-thirds allocated, so PSC 130 continues to element 1310 where PSC 130 compares P with the remaining space in buffer B1 (123). The remaining space in B1 is 3. Since P (3) is greater than one half of the remaining space in B1, PSC 130 sets the space to be allocated, P1, to two packets in element 1308. PSC 130 allocates space for two packets in each of port buffers B (104 and 123) in element 1312 and proceeds to element 1313. PSC 130 marks buffer 123 "fully allocated" because it does not have as much as three packets of space remaining. Buffer 123 is full; buffer 104 has room for three packets.

In element 1314 PSC 130 sends a signaling packet via the signaling channel to station 101. This is the IN-CALL message, message 2 of FIG. 7. This message includes the call ID and the space allocated in buffers 104 and 123 (two packets) for transmissions from station 101 to station 121. This message specifies to station S2 (station 101) that it shall send no more than two packets to station 121 before a return acknowledgement is received, i.e. station 101's window size for this call to station 121 is two packets.

In response to the signaling information just received, station 101 sends the ANSWER, message 3 of FIG. 8, to PSC 103 specifying the same call ID sent from PSC 130 with the INCALL message and indicating that the available space in station buffer 101X for this call is five packets. The process just described, in connection with the allocation of space in buffers 104 and 123, is now followed for port buffers 123 and 103 which are used for the transmission of data from station 121 to station 101. Station 101 is now the receiving station, and "station S2" stands for station 121.

Fourth Allocation

There is currently space in buffer 103 to store five packets and there is space in buffer 124 for four packets. PSC 130 again follows the space allocation process of FIGS. 12 and 13. This time, port buffers B and buffers 124 and 103 of FIG. 1. The flowchart of FIGS. 12 and 13 is entered at element 1201 and the first decision made by PSC 130 is at element 1202. None of the port buffers B (103 and 124) is fully allocated so PSC 130 proceeds to element 1306. Buffer 124 has the least remaining space (four packets) and becomes buffer B1. In element 1307, PSC 130 compares P, the five packets of space available in station buffer 101X to the four packets of space remaining in buffer B1 (124). Since P (5) exceeds the remaining capacity (4) of buffer B1, PSC 130 proceeds to element 1308. Here, P1 is set to two packets. PSC 130 continues to element 1312 and allocates space for two packets in each of port buffers B, (124 and 103). PSC 130 allocates these two packets to the current call and proceeds to element 1313. Buffer 124 has only two packets of unallocated space (4-2) remaining, so it is marked "fully allocated". Buffer 103 has three packets of space unallocated (5-2) and in not marked "fully allocated".

In step 1314, PSC 130 sends signaling information via the signaling channel to calling station 121. This is ANSWERED message, message 4 of FIG. 9. This ANSWERED message includes the call ID which is used by station 121 to associate this message with the call under discussion, and the space allocated to this call in buffers 124 and 103 (two packets). This specifies that station 121 shall send no more than two packets, to station 101 before an acknowledgment is received, i.e. station 121's window size for this call is 2 packets.

At this point in the example, communication may begin up between stations 101 and 121. Station 121 sends no more than two packets to station 101 before it receives a return acknowledgment from station 101. Station 101 sends no more than two packets to station 121 before it receives a return acknowledgment from station 121.

It should be noted, in summary, that the technique illustrated in the above examples allows PSC 130 to control the amount of data that may be going through the switch network buffers, i.e. PSC 130 has a method for performing congestion management.

Figure 2:
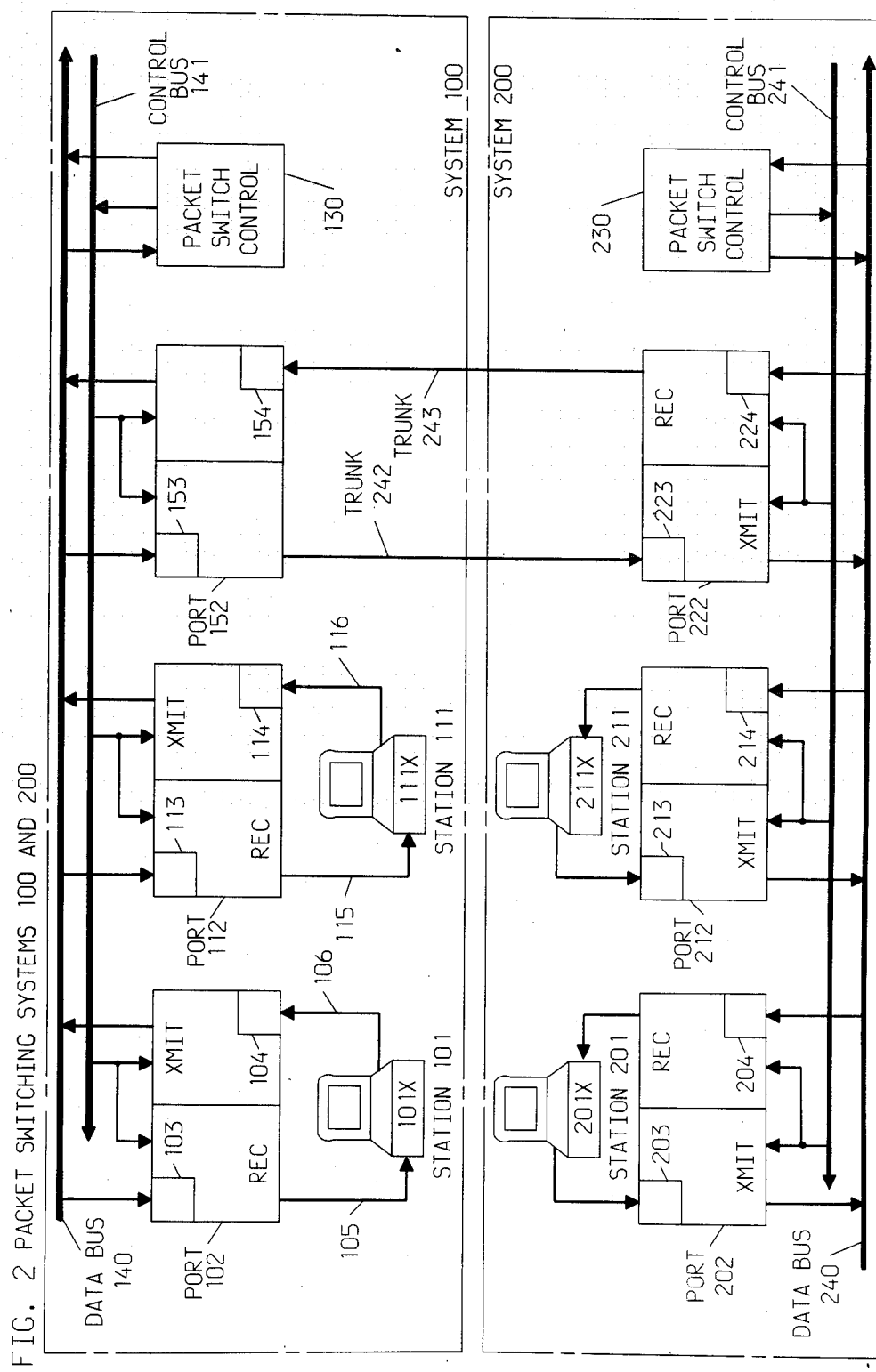
FIG. 2 illustrates a second illustrative packet switching system embodying the invention.

FIG. 2 discloses how the present invention may advantageously be used to facilitate communciation between the stations of packet switching systems 100 and 200. The two systems are interconnected by trunks 242 and 243 and ports 152 and 222 for the serving of calls between the two systems. The following paragraphs describe the operation of the circuitry of FIG. 2 for the serving of a call between station 101 of system 100 and station 211 of system 200.

Assume stations 101 and 111 of system 100 are communicating on a call as before described. Also assume station 211 dials the number of station 101 to establish a call with station 101. Each port of system 100 is programmed at system setup time via control bus 241 channels by PSC 230 in the same manner as priorly described for system 100. Each signaling packet is received by PSC 230 on a unique logical channel which serves to identify the signaling port and station within system 200.

Recall also that each calling station communicates with its PSC by means of what has been described as a "CALL" message (Message 1 of FIG. 6) at the beginning of each call. Thus, in response to the initiation of a call at station 211 when it dials the number of station 101, station 211 transmits a CALL message to its port 212. This message contains the logical channel number to be used by station 211 in serving the call. It still further contains the number dialed at station 211 to reach station 101. The CALL message also includes a call ID arbitrarily chosen by calling station 211 and information specifying the amount of space in buffer 211x that station 211 has made available for this call.

This call message is transmitted from station 211 to port 212 which, in turn, forms it into a packet that is transmitted to PSC 230. This packet contains the format of CALL message 1 FIG. 6 and contains the address of PSC 230, the CALL opcode, the call ID, the calling station channel number serving the call, the calling station receiver buffer size and the address of called station 101. PSC 230 receives the CALL message and after determining, from its cross-index table, that called station 101 is on system 100 it executes the processes priorly described of FIGS. 12 and 13 to compare the calling station 211 buffer size specified in message 1 with the currently available space in port buffers 223 and 214. These are the port buffers of system 200 involved in the transmission of data from station 101 to station 211. The PSC 230 does this computation and allocates to the call the buffer space requested by station 211 in the CALL message of FIG. 6 if permitted by the available space in buffers 223 and 214. Alternatively, PSC 230 reduces the requested allocation if the currently available space in buffers 223 and 214 is not sufficient to comply with the amount of space requested by station 211.

Next, PSC 230 generates its own CALL message that is transmitted via ports 222 and 152 to PSC 130 of system 100. This message is of the type shown in FIG. 14 and contains the address of port 222, the trunk signaling channel number, the CALL opcode, the call ID chosen by PSC 230, the logical channel number of trunk 243 that is to serve the call, the destination station address and the receiver buffer size allocated in system 200 for this call. This message is received by port 222 and passed over trunk 243 to port 152. The information received by port 152 is handled by it in the same manner as if it were connected via paths 242 and 243 to a terminal that was initiating a call.

Port 152 receives the information from port 222 and forms a packet as shown in FIG. 15 containing the address of PSC 120 and applies it to data bus 140 for transmission to PSC 130. This message contains the address of PSC 130, the trunk signaling channel number, (identifies the signaling channel from PSC 230) the CALL opcode, the call ID, the destination station address, the trunk 243 logical channel number to be used on the call and the receiver buffer size allocated in system 200 as determined by PSC 230.

PSC 130 receives the message of FIG. 15, and using its cross index determines from the destination station address that station 101 is the called station. PSC 130 then uses the processes of FIGS. 12 and 13, evaluates the available space in port buffers 104 and 153 that can be allocated in the call. If these buffers have sufficient space, the allocated space becomes the amount requested in message FIG. 15. On the other hand, if the space available in buffers 104 and 153 is insufficient, PSC 130 reduces the buffer space from that requested in the CALL message of FIG. 15 to an amount that is appropriate considering the current occupany of buffers 104 and 153.

As priorly described, PSC 130 now creates an IN-CALL message of the type shown in FIG. 7. This message is transmitted from PSC 130 over data bus 140 to port 102 which serves called station 101. Port 102 receives this message and passes it over path 105 to station 101. The receipt of this message by station 101 advises it of the number of packets (the window size) it can send to station 211 before receiving a return acknowledgment from station 211.

Station 101 and port 102 now send an ANSWER message of the type shown in FIG. 8 to PSC 130 to acknowledge the receipt of the INCALL message sent by PSC 130 to station 101. The ANSWER message of FIG. 8 that port 102 now transmits to PSC 130 contains the PSC 130 address, the signaling channel ID for station 101, the ANSWER opcode, the call ID as supplied by PSC 130, the called station logical channel number serving the call, and also the amount of buffer space that station 101 would like allocated to it for the reception of data from station 211.

PSC 130 receives this ANSWER message from station 101 and evaluates the amount of space available in buffers 154 and 103 with respect to the amount of space requested by station 101 in its ANSWER message of FIG. 8. The requested amount of space is allocated if the conditions within buffers 154 and 103 permit this. On the other hand, the amount of buffer space requested may be reduced by PSC 130 of conditions within buffers 154 and 103 dictate this. In any event, PSC 130 determines the amount of space in buffers 103 and 154 that can be allocated to the call for the direction of transmission of data to station 101 from station 211, and specifies this amount into an ANSWER message which it generates and transmits to port 152. This message is shown in FIG. 16 and contains the address of port 152, the trunk signaling channel number, the ANSWER opcode, the call ID, the trunk 242 logical channel number, and the receiver buffer size allocated to the call by system 100 as determined by PSC 130. The trunk signaling channel number ensures that when the message is received by port 152, that it will be forwarded over the signaling channel of trunk 242. The receipt of the message on the signaling of trunk 242 channel causes port 222 to forward the message on PSC 230. The call ID is necessary to allow association of this message with the call under discussion. The trunk logical channel number information is necessary to indicate what logical channel number will be used to transmit information over trunk 242 from station 101 to 211 once the call is established.

Port 222 receives this information on its signaling channel and forms the information into a packet that is transmitted to PSC 230. This message is of the ANSWER type and is shown in FIG. 17. The message contains the address of PSC 230, the signaling channel number for trunk 242, the logical channel number of trunk 242 to be used in serving the call, the ANSWER opcode, and the buffer space allocated by PSC 130 to serve the call with respect to the direction of transmission from station 211 to station 101. The trunk logical channel number is necessary so that PSC 230 can program port 222 so that when data packets are subsequently received from station 101 over trunk 242 that port 222 can switch these packets to station 211 over its earlier specified logical channel.

The PSC 230 receives the ANSWER message of FIG. 17 and then proceeds the evaluate the status of buffers 213 and 224 using the process of FIGS. 12 and 13 to see if the packet space requested in the message of FIG. 17 can be allocated to the call. If the current occupancy of these buffers permits this allocation, the requested amount of buffer space is assigned to the call. On the other hand, if due to high occupancy of these buffers the request cannot be granted, then the requested amount is reduced and the reduced amount is allocated by PSC 230 to the call.

Finally, PSC 230 generates an ANSWERED message of the type shown in FIG. 9 and transmits it over the data bus 240 to station 211. This message contains the address of port 212, the calling station signaling channel number the ANSWERED opcode, the call ID as earlier specified by PSC 230 and the buffer space assigned to the call with respect to the direction of transmission from station 211 to station 101. With the transmission of this message, the stations 101 and 211 are effectively interconnected on the call and may transmit packet data to each other as priorly described.

The following describes how the system of FIG. 2 operates on an existing call to reduce the size of the transmit window as already described with respect to FIGS. 12 and 13 for an intra-system call within system 100. Let it be assumed that stations 101 and 211 are currently connected and that another station in system 200 attempts to establish a connection to station 211. Let is be assumed that the establishment of this connection requires that the size of the transmit window for station 101 be reduced with respect to transmitting data to station 211. Assume the reduction is necessary because the space in port buffer 214 is currently being fully utilized for data flowing from station 101 to station 211. In any event, PSC 230 makes a determination that the space in buffer 214 must be reallocated and takes the actions now described to bring this about.

As described, PSC 230 first determines the amount by which the space in buffer 214 must be reduced with respect to the direction of transmission from station 101 to station 211 via buffer 214. This requires station 101 to reduct its transmit window to station 211. In order for this to happen, PSC 230 must get a message to PSC 130 advising it of the buffer space reduction. PSC 130 must then get a message to station 101 via port 102.

PSC 230 takes the first step in accomplishing this action by transmitting the message of FIG. 18 to port 222. This message contains the port 222 address, the signaling channel number for trunk 243 the REDUCED TRANSMIT WINDOW opcode, the call ID, and finally the reduced amount of space in buffer 214 that is to be allocated for use when station 101 sends data to station 211. Port 152 receives this message and, since it was received on the signaling channel of trunk 243, port 152 knows that the message is to be routed to PSC 130. Port 152 now forms a packet message of the type shown in FIG. 19 and sends this packet to PSC 130. This packet contains the PSC 130 address, the signaling channel ID (which ID identifies both the signaling channel of trunk 243 and port 152), the REDUCED TRANSMIT WINDOW opcode, the call ID, and the newly reduced buffer size within buffer 214 that is to be used when station 101 transmits to station 211.

The PSC 130 receives the message of FIG. 19 and, in the manner priorly described for an intrasystem call, sends the message of FIG. 10 to port 102 to advise station 101 to reduce its window size when it transmits data to station 211.

Station 101 now generates the message of FIG. 11 to PSC 130 acknowledging the receipt of the message of FIG. 10 by station 101. PSC 130 receives the message of FIG. 11 and must now advise PSC 230 that the window size reduction by station 101 has been accomplished and acknowledged by station 101. PSC 130 generates a message shown in FIG. 20 which contains the address of port 152, the signaling channel number of trunk 242, the REDUCE ACKNOWLEDGE opcode, and the call ID of the call between station 101 and station 211. This packet is sent to port 152. Port 152 receives this information from and passes it to port 222 over trunk 242. Port 222 generates the message of FIG. 21 and transmits it to PSC 230. This message contains the address of PSC 230, the signaling channel ID of trunk 242, the REDUCE ACKNOWLEDGE opcode, and the call ID. The receipt of this message by PSC 230 advises it that station 101 has reduced its window size when transmitting to station 211. This completes the window size reduction by station 211.

FIG. 3 shows how buffer 103 may be used in connection with the serving of the various calls on which station 101 is involved as priorly described. Three of the many possible states for buffer 103 are shown in columns A, B and C of FIG. 3. The numbered rows designated 1 through 8 indicate that buffer 103 has space for eight packets. As will be recalled, a space of three packets is first reserved in buffer 103 for use when station 111 transmits to station 101. Subsequently, let it be assumed that three such packets are transmitted and entered into buffer 103. Since the transmit window size is three, no more packets can some of the packets directed to it and currently stored in port buffer 103. These three packets are shown in spaces 1, 2, and 3 of buffer 103 in column A. The 111 in each such space indicates that the packet came from station 111. The numbers 1, 2, 3 in small circles indicates the order of arrival of these packets from station 111.

Subsequently, a space of two packets was reserved in buffer 103 for use when station 121 transmits to station 101. This condition is shown column B in FIG. 3 wherein two such packets are stored in spaces 4 and 5 with the numbers 1 and 2 in circles indicating the arrival of the packets from station 121.

Subsequently, let it be assumed that station 101 reads two packets out of buffer 103 and that station 111 subsequently transmits two packets intended for station 101 to buffer 103. The state of buffer 103 at this time is shown in column C where the buffer contains one of the three original packets from station 111 in its space 1, where it contains the two packets from station 121 in its spaces 2 and 3 and where it contains the two new packets from station 111 in its spaces 4 and 5. The empty spaces in columns A, B and C represent unused spaces within the buffer 103.

FIG. 4 discloses further details of a PSC such as for example PSC 130. The PSC comprises a microprocessor 442 and a memory 441 which controls the operation of the microprocessor by means of paths 459 and 460. The microprocessor applies information to data bus 140 via elements 455, 446, 452, 443 and 449. The microprocessor applies information to the control bus 141 via elements 457, 448, 454, 445 and 451. The microprocessor 442 receives data from data bus 140 via elements 450, 444, 453, 447 and path 456.

The timing of the operation of the various elements on FIG. 4 is controlled by microprocessor 442 via strobe bus 458 which connects to all such elements. The intelligence that directs the operation of the microprocessor 442 is in memory 441. Processor 442 operates under control of the data stored in memory 441 upon system initialization together with the information dynamically stored in the memory as microprocessor 442 receives information from the data bus and, in turn, applies information to the data bus 140 and control bus 141 during the serving of calls. The information pertaining to the calls being served by the system including the dynamic occupancy of the various buffers is stored in memory 441. The flowcharts of FIGS. 12 and 13 portray the sequence in which memory 441 and microprocessor 442 together operate to allocate buffer space in the various port buffers of FIGS. 1 and 2.

FIG. 5 illustrates further details of a station terminal such as the terminal at station 111. The terminal comprises a microprocessor 505 that operates under control of a RAM memory 509 and a ROM memory 510 via paths 511 and 512. The terminal further includes a keyboard 506, a display screen 507, and a disc drive 508. These elements are controlled from the microprocessor via paths 513, 514 and 515. The terminal receives information from its associated port over path 116, receiver 502, path 518, FIFO queue 504, and memory bus 516. The microprocessor applies information to its associated port via the memory bus 516, FIFO queue 503, path 517, transmitter 501 and path 115. The timing of the reception of information via the microprocessor and the transmission by it to its associated port is controlled by means of strobe bus 519.

The terminal operates in originating a call by first ascertaining the nature of the call as provided by interaction with a user of the terminal. This information is received from RAM 509 by microprocessor 505. The microprocessor converts this information to the number of packets on the call that need to be outstanding from the called endpoint. If this amount of buffer space is less than the unallocated space remaining in the receive FIFO 504, the requested amount of buffer space is then allocated to the call by the terminal and the allocated amount is subtracted from the unallocated buffer space in queue 504 to come up with a new figure that represents the amount of free buffer space in queue 504. If the amount of buffer space needed on the call is greater than the space currently available in the FIFO 504, the call is then denied to the terminal user.

Assuming that the requested amount of buffer space is available in queue 504, the user's call request is accepted and the terminal microprocessor 505 works under control of its memories 509 and 510 to send a CALL message of the type shown in FIG. 6 to PSC 130. The microprocessor then waits for the receipt of an ANSWERED message of the type shown in FIG. 9 as an indication that the call has been established. This message contains the called station receiver buffer size which is stored in memory 509 and controls the number of packets that the terminal can send without receiving a return acknowledgment.

The called terminal is alerted to the presence of a call by the receipt of an INCALL message of the type shown in FIG. 7. This message includes information specifying the calling station receiver buffer size. Microprocessor 505 receives this information and sets its transmitter to operate with no more than the specified amount of packets outstanding. The microprocessor at this time also reads its memory 509 to compute the buffer size with which it desires to operate on the reception of information. This information is converted into the number of packets needed by the receiving terminal to operate efficiently. If this requested amount exceeds that available in its receive FIFO 504, then the call is rejected. If the requested amount is available, it is allocated to the call and the amount of remaining available space in queue 504 is reduced accordingly. Finally, the receiving station responds with an ANSWER message of the type shown in FIG. 8 with the information in this message including the amount of buffer space that it desires allocated to the call for receiving information from the calling terminal.

What is claimed is:

1. A method of operating a packet switching system having a controller and a plurality of ports with each port having a port buffer and an associated station, said packet switching system further having a data bus connected to said controller and to said ports, said method comprising the steps of:
   (1) storing in said controller information specifying the free buffer space currently available in each port buffer of said system;
   (2) establishing a call between a first and a second one of said stations by transmitting a message from said first station to said controller over said bus with said message specifying a requested receiving station buffer size to be used on said call for receiving data at said first station from said second station;
   (3) operating said controller to determine whether said station buffer space requested by said first station can be allocated to said call;
   (4) operating said controller to allocate said buffer space requested by said first station when said requested amount of space is currently available in said port buffer of the port associated with said first station;
   (5) transmitting a message from said controller to said second station over said bus specifying a window size equal to said allocated space for use by said second station in transmitting data to said first station;
   (6) transmitting a message over said bus from said second station to said controller specifying a requested receiving station buffer size to be used in receiving data at second station from said first station;
   (7) operating said controller to determine whether said station buffer space requested by said second station can be allocated to said call;
   (8) allocating said buffer space requested by said second station when said requested amount of space is currently available in said port buffer of the port associated with said second station; and
   (9) transmitting a message over said bus from said controller to said first station specifying a window size equal to said last named allocated space for use by said first station in transmitting data to said second station.

2. The method of claim 1 in combination with the steps of:
   (1) operating said controller to determine that insufficient port buffer space is currently available to allocate in said port buffer of the port associated with said first station the amount of buffer space specified in said message transmitted from said first station to said controller;
   (2) operating said controller to allocate in said last named port buffer a lesser amount of buffer space than that specified in said message sent by said first station; and
   (3) transmitting a message over said bus from said controller to said second station specifying a window size equal to said lesser amount for use by said second station in transmitting data to said first station.

3. The method of claim 2 in combination with the steps of:
   (1) operating said controller to determine that insufficient port buffer space is currently available to allocate in said port buffers the amount of buffer space specified in said message transmitted from said second station to said controller;
   (2) operating said controller to allocate in said port buffers a lesser amount of buffer space than that specified in said message transmitted by said second station; and
   (3) transmitting a message over said bus from said controller to said first station specifying a window size equal to said last named lesser amount for use by said first station in transmitting data to said second station.

4. The method of claim 3 wherein all messages transmitted between said controller and said stations are transmitted sent via an end to end protocol.

5. A method of operating a packet switching system having a controller and a plurality of ports with each port having a port buffer and an associated station and with each station having a station buffer and a station window whose size specifies the maximum number of unacknowledged packets directed to another station that can be extant at any time, said method comprising the steps of:

(1) storing in said controller information specifying the unused buffer space currently available in each port buffer of said system;

(2) operating said controller to allocate port buffer space for the ports associated with a first and a second station for use on a call between said first and said second station; and (3) transmitting messages from said controller to said first and second stations, respectively, with said messages specifying the station window size to be used on said call for transmitting data from said second to said first station and from said first station to said second station, respectively.

6. The method of claim 5 in combination with the additional steps of:

(1) operating said controller to determine port buffer space availability within the ports associated with said first station and a third station when a call from said third station is made to said first station while said call between said first and second stations remains extant;

(2) operating said controller to determine that said buffer space within the port associated with said first station and assigned to said call between said first and second station must be reduced to serve said call between said first and third stations;

(3) operating said controller to allocate port buffer space within the ports associated with said first and third stations for said call between said first and third stations by reducing priorly allocated port buffer space within the port associated with said first station for use on said first mentioned call and by allocating at least some of said reduced space to said last mentioned call;

(4) transmitting messages from said controller to said first and third stations to specify station window sizes equal to said last named allocations for use in transmitting data between said first and third stations; and (5) transmitting a message from said controller to said second station to specify a new and reduced station window size to be used in transmitting data from said second station to said first station.

7. The method of claim 6 wherein all messages transmitted between said controller and said stations are transmitted via an end to end protocol.

8. A method of operating a packet switching system having a controller and a plurality of ports with each port having a port buffer and an associated station and with each station having a station buffer and a station window whose size specifies the maximum number of unacknowledged packets directed to another station that can be extant at any time, said packet switching system further having a data bus connected to said controller and to said ports, said method comprising the steps of:

(1) sending messages over said bus from a first and a second station involved on a call to said controller requesting a specified amount of station buffer space to be used by each station in receiving data from the other station involved on said call;

(2) operating said controller to determine that the requested amount of space can be allocated in the port buffers of the ports associated with said first and second stations for exchanging data between said first and second stations; and (3) sending a message over said bus from said controller to said first and second stations on said call specifying the window size to be used by each station in transmitting data to the other station on said call.

9. The method of claim 8 in combination with the steps of:

(1) initiating a call from a third station to said first station while said call between said first and second stations remains extant;

(2) sending a message over said bus from said first station and said third station, respectively, to said controller requesting a specified amount of station buffer space for receiving data from said third station and said first station, respectively;

(3) operating said controller to determine the amount of space in the port buffer of the ports associated with said first station and said third station that can be allocated for transmitting data between said first station and said third station;

(4) operating said controller to determine that the buffer space of the port associated with said first station and allocated to said call between said first and second stations for transmitting data from said second station to said first station must be reduced to serve said call between said first station and said third station;

(5) sending a message over said bus from said controller to said second station reducing the window size for the transmission of data to said first station from said second station; and (6) sending messages over said bus from said controller to said first and third stations specifying the window sizes to be used in transmitting data between said first and third stations.

10. The method of claim 9 wherein all messages sent between said controller and said stations are sent in an end to end protocol.

11. A method of operating a packet switching system having a controller and a plurality of ports with each port having a port buffer and an associated station and with each station having a station buffer and a station window whose size specifies the maximum number of unacknowledge packets directed to another station that can be extant at any time, said method comprising the steps of:

(1) sending a message from a first station to said controller requesting a specified amount of receiving station buffer space to be used by said first station in receiving data on a call from a second station;

(2) operating said controller in response to the receipt of said message to determine whether said requested space can be allocated within the port buffer of the port associated with said first station, (3) determining that said requested space can be allocated;

(4) allocating said requested buffer space in the port buffer of the port associated with said first station; and (5) sending a message from said controller to said second station specifying the window size to be used by said second station in transmitting data to said first station.

12. The method of claim 11 in combination with the steps of:

(1) sending a message from said second station to said controller requesting a specified amount of receiving station buffer space to be used by said second station in receiving data on said call from said first station;

(2) operating said controller in response to the receipt of said last named message to determine whether the said buffer space requested by said second station can be allocated with the port buffer of the port associated with said second station;

(3) determining that said last named requested space can be allocated;

(4) allocating said last named requested buffer space in the buffer of the port associated with said second station, and (5) sending a message from said controller to said first station specifying the window size to be used in transmitting data to said second station.

13. The method of claim 12 in combination with the steps of:

(1) initiating a call from a third station to said first station by sending messages to said controller from said first station and said third station requesting a specified amount of receiving station buffer space to be used by said first station and said third station, respectively, in receiving data from said third station and said first station respectively;

(2) operating said controller to determine that the port buffer space in the port associated with said first station and allocated to said call between said first station and said second station for transmitting data from said second to said first station must be reduced;

(3) reducing the buffer space within the port associated with said first station and allocated to said call between said first station and said second station;

(4) sending a message to said second station reducing the window size on the transmission of data to said first station; and (5) sending messages to said first and third stations specifying the window sizes to be used in transmitting data between said first and third stations.

14. A method of operating a packet switching system having a controller and a plurality of ports with each port having a port buffer and an associated station and with each station having a station buffer and a station window whose size specifies the maximum number of unacknowledged packets directed to another station can be extant at any time, said packet switching system further having a data bus connected to said controller and to said ports, said method comprising the steps of:

(1) sending a message over said bus from a first station to said controller requesting a specified amount of receiving station buffer space for use in receiving data on a call from a second station;

(2) storing in said controller information specifying the free buffer space currently available in each port buffer of said packet switching system;

(3) operating said controller in response to the receipt of said message to determine whether said buffer space requested by said first station is available in said port buffer of the port associated with said first station;

(4) determining that said requested space is currently available in said port buffer of said port associated with said first station;

(5) allocating said buffer space in said last named port by sending a message over said bus from said controller to said second station upon said determination specifying the station window size to be used in said second station in transmitting data from said second station to said first station; and (6) storing said station window size information in said second station for use in transmitting data to said first station.

15. The method of claim 14 in combination with the steps of:

(1) sending a message over said bus from said second station to said controller requesting a specified amount of receiving station buffer space to be used for receiving data on said call from said first station;

(2) operating said controller to determine whether the buffer space requested by said second station is available in said port buffer of said port associated with said second station;

(3) determining that said last named requested buffer space is available in said port associated with said second station;

(4) allocating said last named buffer space by sending a message over said bus from said controller to said first station specifying the window size to be used by said first station in transmitting data to said second station; and (5) storing said last named window size information in said first station for use in transmitting data to said second station.

16. The method of claim 15 in combination with the steps of:

(1) initiating a call from a third station to said first station while said call between said first and second stations remain extant;

(2) transmitting messages over said bus from said first station and said third station to said controller requesting a specified amount of receiving station buffer space within said first station and said third station, respectively, for use in receiving data on said call from said third station and said first station, respectively, (3) operating said controller to determine that the port buffer space of the port associated with said first station and allocated for use in the transmission of data from said second station to said first station must be reduced;

(4) reducing said last named buffer space;

(5) sending a message over said bus from said controller to said second station reducing the window size of said second station for the transmission of data from said second station to said first station; and (6) sending messages over said bus from said controller to said first and third stations specifying the station window size to be used in transmitting data between said first and third stations.

17. The method of claim 16 wherein all messages sent between said controller and said stations are in an end to end protocol.

18. A method of operating a network of packet switching systems interconnected to each other by trunks, each packet switching system having a data bus, a controller connected to a said data bus, each of said packet switching systems further having a plurality of ports each of which is connected to said data bus of its system and to an associated station individual to each port, each of said ports having an associated port buffer, said method comprising the steps of:

(1) establishing a call between a first station in a first one of said systems and a second station in a second one of said systems by transmitting a message over said bus of said first system from said first station to said controller of said first system with said message specifying a requested receiving station buffer size for use on said call in receiving data at said first station from said second station;

(2) storing in said controller of said first system information specifying the free buffer space currently available in each port buffer of said first system;

(3) operating said controller of said first system to determine whether said receiving buffer space requested by said first station in said message can be allocated within the port buffers of said first system;

(4) allocating said buffer space requested by said first station when said requested amount of space is available within the port buffers of said first system for the transmission of data from said second station to said first station;

(5) transmitting a message from said controller of said first system over said buses of each system and over said trunks to the controller of said second system specifying the buffer space allocated in said first system for the transmission of data from said second station to said first station;

(6) storing in said controller of said second system information specifying the free buffer space currently available in each port buffer of said second system;

(7) operating said controller of said second system to determine whether said buffer space specified by said controller of said first system in said last named message can be allocated within the port buffers of said second system;

(8) operating said controller of said second system to allocate said buffer space requested by said controller of said first system when said requested amount of space is available within the port buffers of said second system;

(9) transmitting a message from said controller of said second system over said bus of said second system to said second station specifying a window size equal to said allocated space within the port buffers of said second system for use by said second station in transmitting data to said first station;

(10) transmitting a message from said second station over said bus of said second system to said controller of said second systems specifying a requested receiving station buffer size for use in receiving data at said second station from said first station;

(11) operating said controller of said second system to determine whether said receiving buffer space requested by said second station can be allocated within the port buffers of said second system;

(12) operating said controller of said second system to allocate said buffer space requested by said second station when said requested amount of space is available within the port buffers of said second system;

(13) transmitting a message from said controller of said second system over said buses of both system and over said trunks to the controller of said first system specifying the buffer space allocated in said second system for the transmission of data from said first station to said second station;

(14) operating said controller of said first system to determine whether said buffer space specified by said controller of said second system in said last named message can be allocated within the port buffers of said first system;

(15) allocating said buffer space specified by said controller of said second system when said requested amount of space is available within the port buffers of said first system; and

(16) sending a message from said controller of said first system over said bus of said first system to said first station specifying a window size equal to said last named allocated space to be used by said first station in transmitting data to said second station.

19. The method of claim 18 wherein all messages sent between said controllers and said stations are sent in an end to end protocol.

* * * * *